US008323545B2

(12) United States Patent
Sudano et al.

(10) Patent No.: US 8,323,545 B2
(45) Date of Patent: Dec. 4, 2012

(54) CO-EXTRUSION PROCESS FOR MAKING DECORATIVE MOLDINGS HAVING SIMULATED WOOD APPEARANCE AND DECORATIVE MOLDING MADE THEREBY

(75) Inventors: Angelo Sudano, Montreal (CA); Benoit Meloche, Blainville (CA)

(73) Assignee: Plastibec Inc., Boisbriand, Quebec (CA)

( * ) Notice: Subject to any disclaimer, the term of this patent is extended or adjusted under 35 U.S.C. 154(b) by 358 days.

(21) Appl. No.: 12/724,029

(22) Filed: Mar. 15, 2010

(65) Prior Publication Data
US 2011/0177291 A1 Jul. 21, 2011

Related U.S. Application Data

(60) Provisional application No. 61/295,833, filed on Jan. 18, 2010.

(51) Int. Cl.
*B29C 47/00* (2006.01)
(52) U.S. Cl. .............. 264/177.16; 264/40.1; 264/40.6; 264/40.7; 264/75; 264/171.1; 264/171.13; 264/177.1; 264/211.21; 264/259
(58) Field of Classification Search .............. 264/40.1, 264/40.6, 40.7, 171.1, 177.1, 211.21, 259, 264/45.9–46.3, 74, 75, 171.13, 171.23, 171.25, 264/173.11, 173.12, 173.13, 173.14, 173.16, 264/173.17, 173.18, 173.19, 174.1, 177.16, 264/211
See application file for complete search history.

(56) References Cited

U.S. PATENT DOCUMENTS

| 4,306,848 | A | * | 12/1981 | Nunn | 425/208 |
|---|---|---|---|---|---|
| 4,802,140 | A | * | 1/1989 | Dowling | 366/79 |
| 6,583,189 | B1 | * | 6/2003 | King | 521/79 |
| 2004/0038002 | A1 | * | 2/2004 | Franco et al. | 428/151 |
| 2004/0232581 | A1 | * | 11/2004 | Hills | 264/75 |
| 2009/0035581 | A1 | * | 2/2009 | Sudano | 428/421 |

* cited by examiner

*Primary Examiner* — Christina Johnson
*Assistant Examiner* — Saeed Huda
(74) *Attorney, Agent, or Firm* — Merchant & Gould P.C.

(57) ABSTRACT

A co-extrusion process for making decorative moldings having a simulated wood appearance and a given profile includes mixing a base material and color particles to form a mixture, the base material having a rigid polymer and the color particles having a different color from the base material and a higher melt temperature than the base material. The mixture is heated and displaced using a feed screw such that the color particles move helically along the trajectory of the feed screw while avoiding backflow and melting to create corresponding helical vein segments within the base material. The mixture is forced through a tubular channel while controlling heat and shear conditions such that the helical vein segments remain substantially intact. The mixture is fed into a die having at least a first tubular inlet communicating with the tubular channel, a first outlet having a planar shape corresponding to the given profile, and a first cavity between the inlet and the outlet, the cavity having a form to flatten and widen the mixture to produce a planar surface coating at the outlet wherein the helical vein segments are transposed into two-dimensional nested arches simulating wood appearance. The surface coating is extruded onto a first side of a core having cellular polymer material, producing the decorative mouldings.

24 Claims, 5 Drawing Sheets

CO-EXTRUSION PROCESS FOR MAKING DECORATIVE MOLDINGS HAVING SIMULATED WOOD APPEARANCE AND DECORATIVE MOLDING MADE THEREBY

This application claims benefit of U.S. Provisional Ser. No. 61/295,833, filed 18 Jan. 2010 and which application is incorporated herein by reference. To the extent appropriate, a claim of priority is made to the above disclosed application.

FIELD OF THE INVENTION

The present invention relates to the filed of co-extrusion processes for making millwork having a simulated wood appearance.

BACKGROUND

Some known methods for creating simulated wood appearance on plastics have employed a compressed or extruded mixture of wood particles and polymer to form an object. Including real wood-based material is problematic in terms of material and manufacturing cost, material compatibility and the properties of the final product.

There have been some attempts to use co-extrusion to make plastic articles that have a wood grain appearance. One known method uses a feed screw within an oversized barrel to advance plastic including two different colors, so that a significant gap in between the barrel and the screw causes backflow of the plastic behind the screw threads to promote flow surges to ultimately allow colored "swirl" patterns. This technique has a number of disadvantages. It requires elevated screw rotation speed to advance the plastic quickly enough so that the color pigments do not completely disperse into the plastic which would undesirably create a uniformly coloured material. This high dependence and sensitivity to screw speed also makes it difficult to control shear conditions and reproduce the process to manufacture a consistent end product. The reliance on fast screw rotation also obliges that the temperature be reduced, again to avoid completely melting and dispersing the pigments throughout the material. In addition, specially designed equipment (barrel and screw) must be used to allow the required gap to promote the backflow surges. Premature wear on the screw or premature wear on the barrel will diminish this effect to the point where "swirls" are no longer apparent; not enough back pressure on the die will also reduce the swirl effect or to the point where linear lines become apparent which is not the desired effect. The technique tends to produce a pattern of linear streaks, which can resemble some wood types but is not always the desired wood grain effect.

There is indeed a need for a technology that can overcome at least some of the disadvantages of what is known in this filed.

SUMMARY OF THE INVENTION

The present invention responds to the above need by providing a co-extrusion process for making mouldings having a simulated wood appearance and moldings made thereby.

More particularly, the invention provides a co-extrusion process for making decorative moldings having a simulated wood appearance and a given profile, comprising:

mixing a base material and colour particles to form a mixture, the base material comprising rigid polymer and the colour particles having a different colour from the base material and a higher melt temperature than the base material;

heating and displacing the mixture using a feed screw such that the colour particles move helically along the trajectory of the feed screw while avoiding backflow and melting to thereby create corresponding helical vein segments within the base material;

forcing the mixture through a tubular channel while controlling heat and shear conditions such that the helical vein segments remain substantially intact;

feeding the mixture into a die having at least a first tubular inlet communicating with the tubular channel, a first outlet having a planar shape corresponding to the given profile, and a first cavity in between the inlet and the outlet, the cavity having a form to flatten and widen the mixture to produce a planar surface coating at the outlet wherein the helical vein segments are transposed into two-dimensional nested arches simulating wood appearance; and co-extruding the surface coating onto a first side of a core comprising cellular polymer material, thereby producing the decorative mouldings.

Preferably, controlling the heat and shear conditions comprises controlling the rotational speed of the feed screw, the heat imparted to the mixture, and the diameter of the tubular channel.

Preferably, controlling the heat imparted to the mixture comprises maintaining the temperature of the mixture higher than the melting temperature of the base material and at or below the melting temperature of the color particles.

Preferably, the process comprises the temperature of the mixture is maintained at about 15° C. above the melting temperature of the base material.

Preferably, the melt temperature of the base material is about 20 to 30° C. higher that the melt temperature of the colour particles.

Preferably, the feed screw comprises a screw and a barrel, the screw and the barrel having a tolerance of about 5 mil.

Preferably, the color particles are sized and selected such that each color particle completely melts when forming a corresponding one of the helical vein segments.

Preferably, a fraction of the color particles are sized and selected such that such color particles partially melt to form partially melted helical vein segments, each of such partially melted helical vein segments having a head end and a tail end, thereby leaving a residual nodule of the color particle at each head end.

Preferably, the colour particles comprise a pigment and a carrier, the pigment having a different colour from the base material and the carrier having a higher melt temperature than the base material.

Preferably, the base material has a white or neutral color.
Preferably, the color particles comprise a first set having a first color and a second set having a second color, the first and second colors being different.

Preferably, the cavity of the die is defined by a multilevel surface comprising a plurality of sections with transitional steps bridging adjacent ones of the sections to cause the mixture to distribute evenly at the outlet to correspond to the given profile. Preferably, the transitional steps are curvilinear. Each transitional step and corresponding section may be joined at a bevelled edge. Preferably, the multilevel surface comprises a wedge-shaped portion projecting upstream proximate to the inlet for diverting the mixture to either side. Preferably, the wedge-shaped portion has a camel back shape. Preferably, the wedge-shaped portion is defined by part of at least one of the transitional steps. Preferably, the plurality of sections comprise a bottom section having a first thickness; and a top section having a second thickness greater than the first thickness. The plurality of sections may comprise at least one intermediate section, each provided between the top and bottom sections. At least one of the sections may be a cove-shaped section, each cove-shaped section being bordered by a corresponding one of the transitional steps. The given profile may comprise at least one concavity and each cove-shaped section is positioned relative to the outlet of the die to be associated with a corresponding one of the concavities. Preferably, the given profile comprises at least one dimple and at least one of the transitional steps comprises a groove corresponding to each of the at least one dimples, each groove being positioned relative to the outlet of the die to be associated with a corresponding one of the dimples. Preferably, the multilayer surface narrows the depth of the cavity of the die from about 400 mil proximate to the tubular inlet to about 10 mil at the outlet of the die. Preferably, the cavity of the die further comprises a bifurcated passage extending from the tubular inlet around the multilevel surface. Preferably, the die comprises a core-extruding component extending away from the cavity, the core-extruding component having an outer surface for bearing the mixture and apertures for extruding the cellular polymer material, wherein the mixture flows along the outer surface and beyond the apertures to form the surface coating where the cellular polymer material expands to contact the surface coating and form the co-extruded decorative moulding.

The invention also provides a co-extruded decorative molding having a simulated wood appearance and a given profile. The molding includes a core comprising cellular polymer material and having first and second opposed surfaces. The molding also includes a coating co-extruded onto the first surface of the core. The coating includes a base material comprising rigid polymer and pigmented nested arches within the base material and having a different color from the base material, the pigmented nested arches being formed by transposed, flattened and widened pigmented helical vein segments.

Preferably, the co-extruded coating comprises a first layer co-extruded onto the first surface of the core and a second layer co-extruded onto the second surface of the core.

Preferably, the first and second layers of the co-extruded coating are melt contacted so as to integrally encompass the core.

Preferably, the pigmented nested arches comprise a head end and a tail end.

Preferably, the head end of each of a fraction of the pigmented nested arches is nodule-shaped.

Preferably, the head end and the tail end of each pigmented nested arches is streak-shaped.

Preferably, the colour particles comprise a pigment and a carrier, the pigment having a different colour from the base material and the carrier having a higher melt temperature than the base material.

Preferably, the base material has a white or neutral color. Preferably, the color particles comprise a first set having a first color and a second set having a second color, the first and second colors being different.

Preferably, the given profile comprises at least one concavity and at least one convexity, the co-extruded coating being distributed in a generally constant thickness over the at least one concavity and the at least one convexity.

Preferably, the given profile comprises at least one dimple, the co-extruded coating being distributed in a generally constant thickness within the at least one dimple.

Various optional embodiments and aspects of the process and moldings of the present invention will be understood in light of the below description and the drawings.

DETAILED DESCRIPTION OF PREFERRED EMBODIMENTS

The process of the present invention allows the production of co-extruded decorative moldings with a simulated wood appearance. This may be generally referred to as "wood modelling". Embodiments of the process enable replication of certain species of woods, such as for example, "Maple wood", "Birchwood", "Basswood" and certain "exotic wood" species. By feeding the color particles with a base material in a feed screw while avoiding backflow surges over the screw threads, managing the shear and heat conditions, and providing various extrusion die designs, the wood modeling benefits from pigmented nested arches on the final co-extruded coating with a variety of different effects depending on the given profile of the molding and the desired wood appearance.

In one aspect of the present invention, there is provided a co-extrusion process for making decorative moldings having a simulated wood appearance and a given profile.

Figure 3:
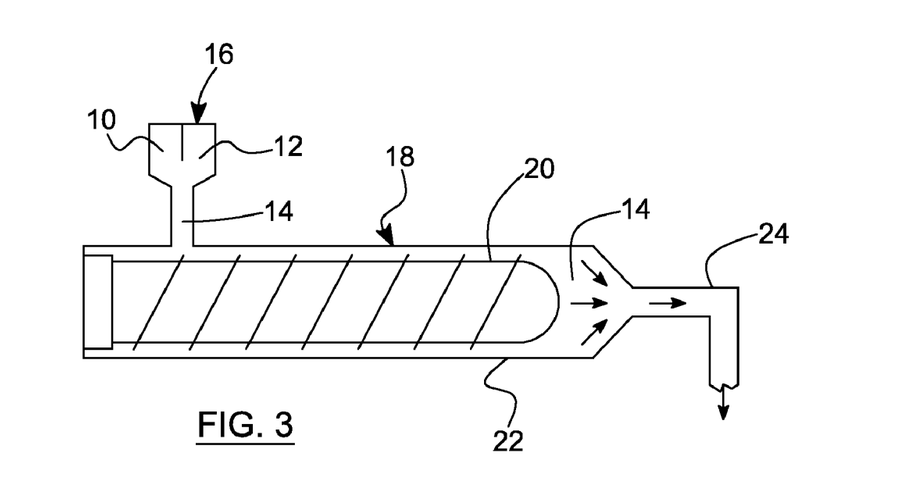
FIG. 3 is a side view schematic representation of part of an apparatus with which an embodiment of the process of the present invention may be performed.

Referring to FIG. 3, the process first comprises mixing a base material 10 and colour particles 12 to form a mixture 14. The base material 10 comprises rigid polymer, which may be called "capstock". The colour particles 12 have a different colour from the base material 10 and a higher melt temperature than the base material 10. The base material 10 and the color particles 12 may be provided in the form of pellets and mixed together in a multi-vessel hopper 16.

Referring to FIG. 3, the mixture 14 is then provided into a feed screw 18, where it is heated and displaced such that the colour particles move helically along the trajectory of the feed screw while avoiding backflow over the screw threads. The color particles melt while moving to create corresponding helical vein segments (character 26 in FIG. 1) within the base material. The screw 20 and the barrel 22 of the feed screw 18 preferably have a tolerance of about 5 mil.

The mixture is then forced through a tubular channel 24 while controlling heat and shear conditions such that the helical vein segments 26 remain substantially intact. It should be understood that there may be a great number of vein segments within the base material and they may be randomly distributed such that some of the vein segments bleed into each other. The helical vein segments are therefore not completely "discrete", but nevertheless remain visually intact and distinguishable.

Figure 1:
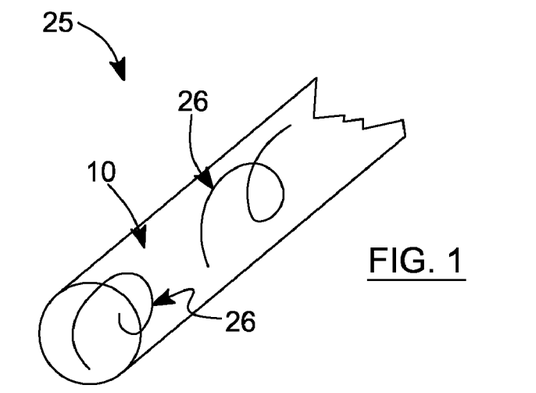
FIG. 1 is a perspective cut view schematic representation of a cylindrical mixture comprising helical vein segments, in connection with an embodiment the present invention.

Referring to FIG. 1, within the tubular channel, the mixture preferably has a continuous cylindrical form 25 comprising the base material 10 and the helical vein segments 26.

The mixture 14 travels within the tubular channel 24, making sure that the heat and shear energy imparted to the mixture is not sufficient to completely mix the color throughout the mixture. The tube diameter may be about 0.5 inches, and the speed of the co-extruder between 10 and 17 RPM, preferably about 12 RPM. The barrel is divided in four zones which are heated, the first near the hopper is heated to around 280-285° F. and the fourth is heated to about 325-330 F. There is an adapter (not illustrated) between the tubular channel 24 and the outlet of the barrel and the adapter is heated to about 325-330° F. to ensure that the material does not cool down before entering the die (which is usually heated to about 340-345° F. to ensure flow therein).

Figure 6:
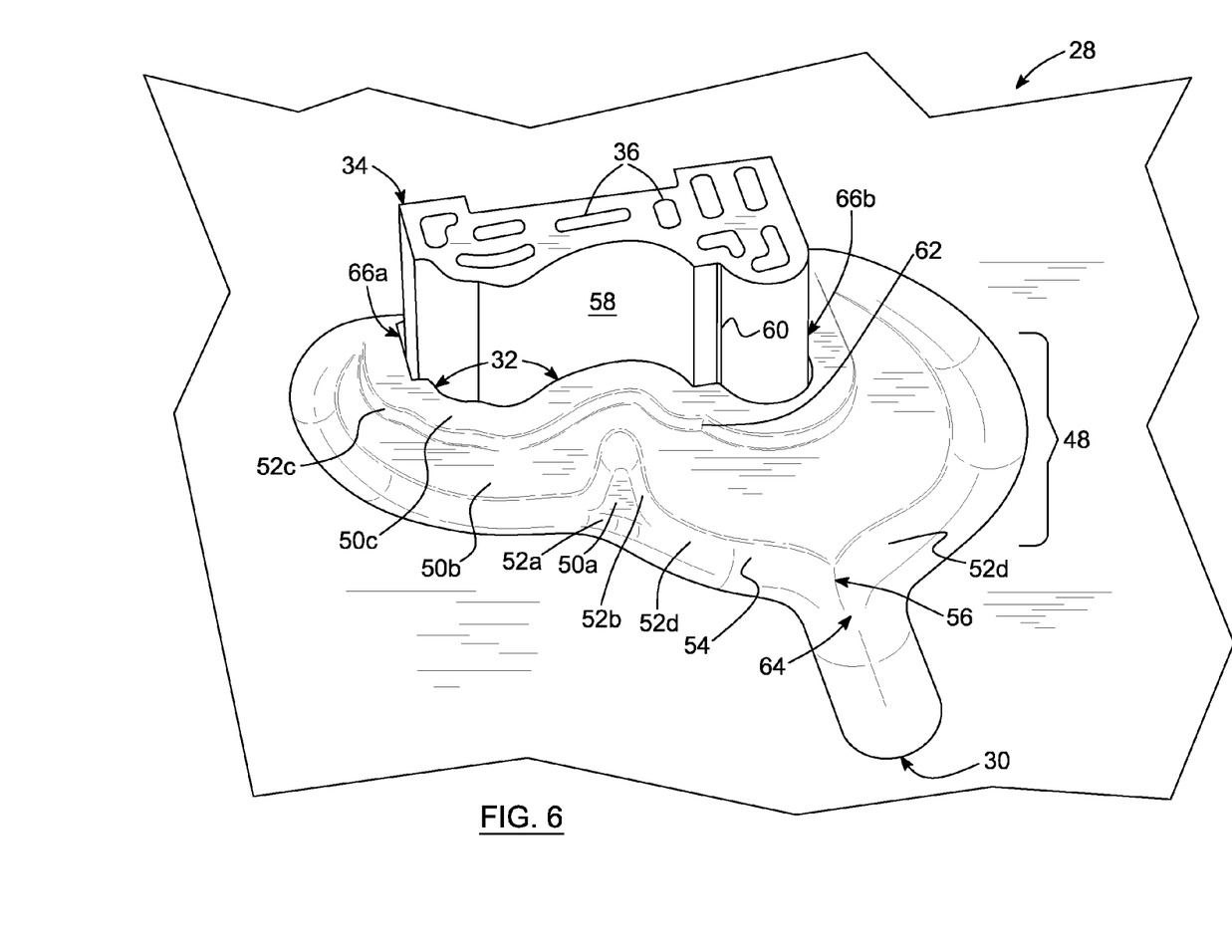
FIG. 6 is a perspective view of part of a die cavity for co-extruding the mixture onto a core, in connection with an embodiment the present invention.

Referring now to FIG. 6, the mixture is then fed into a die (part of half of which in shown as 28 in FIG. 4) having at least a first tubular inlet 30 communicating with the tubular channel (24 in FIG. 3). The die also comprises an outlet 32 arranged proximately to a foam-extruding component 34 comprising apertures 36 out of which the foam core of the molding is extruded. The mixture flows into the die through the inlet 30 to the outlet 32 and travels along the outer surface of the foam-extruding component 34, and the mixture is co-extruded onto the foam core material to form the molding. The co-extruded product is kept in its desired shape, avoiding warpage as it is cooled.

Figure 4:
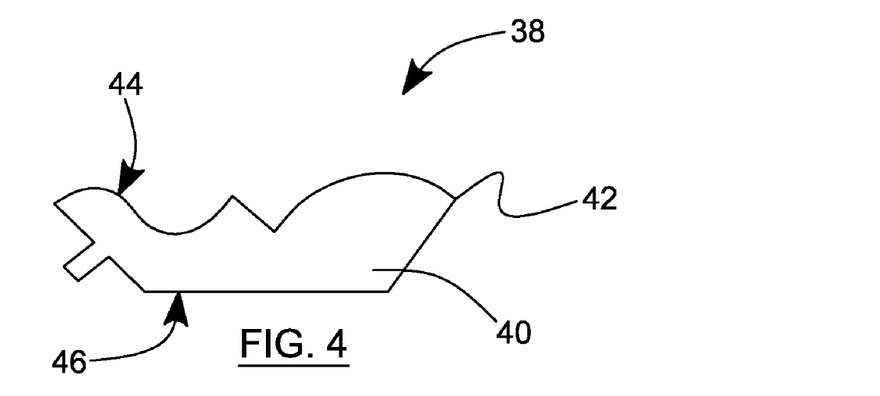
FIG. 4 is a transverse cut view of a molding with one profile according to an embodiment of the present invention.
Figure 5:
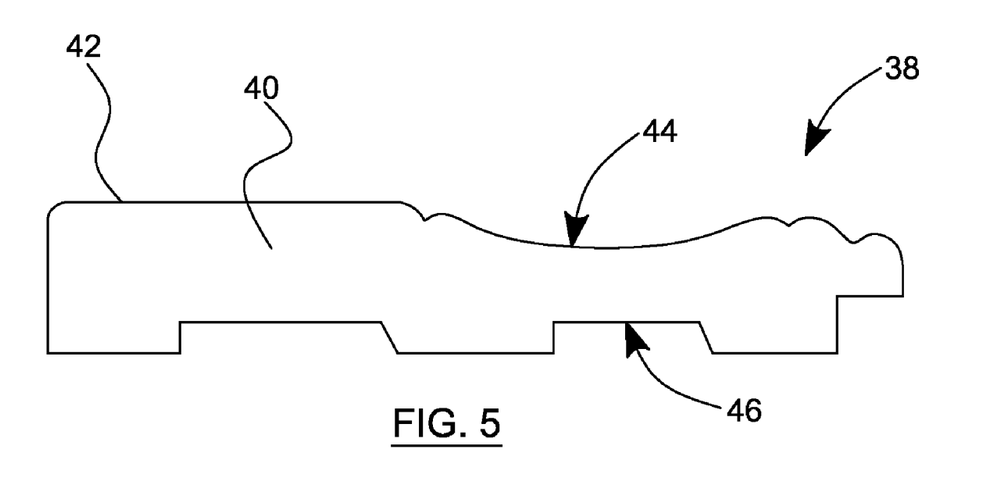
FIG. 5 is a transverse cut view of a molding with another profile according to an embodiment of the present invention.

Referring to FIGS. 4 and 5, the process produces a co-extruded molding 38 having a foam core 40 and an outer surface coating 42. As will be understood by a person skilled in the art, many different shapes, sizes and configurations of profile features may be obtained on the end-product molding. Also, depending on the die setup, the surface coating may be applied on the front face 44 only (leaving the back face 46 foam core only) or may be applied around the entire periphery of the core 40.

Figure 2:
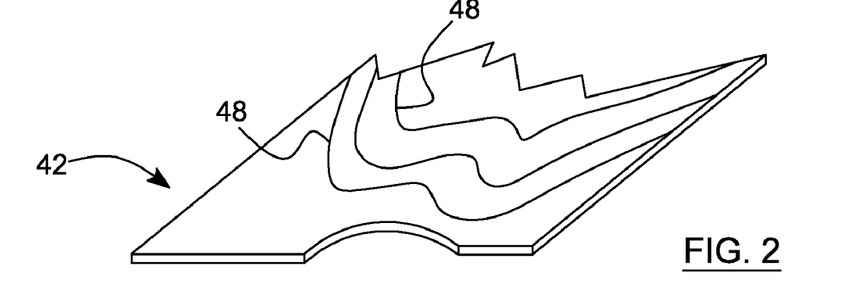
FIG. 2 is a perspective view schematic representation of a flattened and widened co-extruded coating comprising transposed pigmented nested arches, in connection with an embodiment the present invention.

FIG. 6 shows one type of profile. The die has a cavity defined by two parts, one of which is shown as 28, the opposing side not being illustrated. The cavity has a form to flatten and widen the mixture to produce a planar surface coating at the outlet 32. "Planar" in this context does not mean mathematically flat, but rather means that the coating is thin and close to two-dimensional to conform coat the surface of the foam core to be relatively uniform and even. The helical vein segments (26 in FIG. 1) are thus transposed into two-dimensional nested arches (48 in FIG. 2) advantageously simulating wood appearance. FIG. 2 represents the final extruded coating 42 without the core. The surface coating 42 is co-extruded onto at least a front face (44 in FIGS. 4 and 5) of the core (40 in FIGS. 4 and 5). The core 40 is preferably made of cellular polymer material.

Thus, the co-extruded decorative molding is produced. As will be understood, the co-extrusion process is continuous and produces an indefinitely long length of molding that can be cut down to lengths as required for storage, shipping, or installation, as the case may be.

The die may also comprise a second tubular inlet, a second outlet and a second cavity in opposed and spaced relationship with the first of the same, for allowing co-extrusion of a second surface coating onto the back face of the core. Though both first and second die parts are not illustrated in the figures, it should be understood that the second part may be very similar in general to the first but will often have a different configuration of die cavity corresponding to the second side of the molding profile. The die outlets may be configured with respect to each other, such that the co-extruded first and second surface coatings contact at corresponding side edges thereof, thereby encompassing the core. The coating may thus be integral and melt bonded at the side edges. Alternatively, there may be only one coating at the first surface of the core, which is the profiled surface that will be visible when installed.

Co-extrusion of the surface coating onto the front and back sides (also called "faces") of the core can also be done by configuring one die cavity and outlet such that the mixture flows around the entire periphery of the core and travels along the entire surface of the foam-extruding component 34, essentially as a flowing tube-shaped material, to be co-extruded around the core as the foam exits the apertures and expands to contact the outer surface coating.

Preferably, the process also comprises controlling the heat and shear conditions comprises controlling the rotational speed of the feed screw, the heat imparted to the mixture, and the diameter of the tubular channel. Controlling the heat imparted to the mixture can be performed by maintaining the temperature of the mixture higher than the melting temperature of the base material and at or below the melting temperature of the color particles. The base material and the colour particles may have a difference in melt temperatures of about 20-30 F.

The color particles may be sized and selected to provide various wood modelling effects. For instance, the color particles may be sized and selected such that each color particle completely melts when forming a corresponding one of the helical vein segments, to produce wood appearance absent knots. The helical vein segments thus have streak-shaped ends. Alternatively, a fraction of the color particles may be sized and selected such that those color particles partially melt to form partially melted helical vein segments, each of such partially melted helical vein segments having a head end and a tail end, thereby leaving a residual nodule of the color particle at each head end. In this case, the unmelted nodules simulate wood knots. Color particles that are larger or have higher melt temperatures result in bigger knots, of course when the temperature and shear are managed to keep the head end nodules. Other wood modelling effects may be achieved by providing color particles of different size, color and number. For instance, one may provided large light-brown particles in greater number than small dark-brown particles, to create a multilayered, multicoloured effect common to some wood species. By varying the quantity of each type of particle, the overall wood grain effect may also be varied. The color particles may be introduced between 0.3% and 8.0% relative to the total amount of material including capstock.

The colour particles may comprise a pigment and a carrier, where the pigment has a different colour from the base material and the carrier has a higher melt temperature than the base material. The base material preferably a white or neutral color, but may also be colored.

In one aspect of the present invention, the die has a design to adapt the plastic flow from the tubular channel to the die outlet to conform to the profile of the core. At this point, preferred die features will be further described in detail in relation to various types of molding profile features.

Referring to FIG. 6, the cavity of the die 28 may defined by a multilevel surface 48 comprising a plurality of sections 50a,b,c with transitional steps 52a,b,c bridging adjacent ones of the sections to improve the even distribution of the mixture at the outlet 32 to correspond to the given profile, which corresponds to the outer surface of the foam-extruding component 34. Even distribution not only aids in the final appearance of the wood grain but also in maximizing material use efficiency. The mixture will thus proceed into the die via the inlet 30, flow over the multilevel surface 48, expel through the outlet 32, and travel along the outer surface of a foam extruder 34, to then be co-extruded onto the foam core.

FIG. 6 shows a case where the multilevel surface 48 comprises a small bottom section 50a, an intermediate section 50b and a top section 50c. The sections are joined by corresponding transitional steps 52a-52c. Depending on the configuration of the multilevel surface 48, there may be a single transitional step that forms into two separation steps at some locations along multilevel surface. This is the case where steps 52a and 52b form a single step 52d on either side of the small section 50a. Preferably, the transitional steps are curvilinear, which can aid in the flow of the plastic mixture. Also preferably, each transitional step and corresponding section are joined at a bevelled edge 54. The multilevel surface 48 is preferably smooth and machined to provide a continuous curviplanar surface generally without angled edges.

The multilevel surface 48 also preferably comprises a wedge-shaped portion 56 projecting upstream for diverting the mixture to either side. The wedge-shaped portion 56 may have a camel back shape or have an edge-shaped tip. A camel back shape can improved the gentle flow of the mixture. The wedge-shaped portion 56 may be defined by at least one of the transitional steps, in the case of FIG. 6 by step 52d. There may also be multiple wedge-shaped portions, each defined by a corresponding transitional step.

Of course, as will be appreciated from the figures, the bottom section has a first thickness, the top section has a second thickness greater than the first thickness, and the intermediate section is in between. There may also be multiple intermediate sections, arranged one above the other.

At least one of the sections may be a cove-shaped section. In FIG. 6, section 50a is a cove-shaped section, being bordered by corresponding transitional step 52a. The cove-shaped section aids in the flow of the plastic mixture for conforming to a profile with a relatively shallow concavity. The concavity of the molding can be appreciated in FIG. 6 as corresponding to surface 58 of the foam-extruding component 34. There may also be a plurality of cove-shaped sections at different heights, to correspond to different sizes, shapes and depths of concavities. Preferably, the cove-shaped section 50a is followed by a section 50b and transitional step 52c that are configured to have a conforming but less acute curvature than the cove-shaped section 50a. The cove-shaped section thus allows an increased amount of material to flow there-over and the subsequent section and transitional step spread such material evenly over the target concavity of the profile.

When the given profile comprises at least one dimple 60, a corresponding transitional step may comprise a corresponding groove 62. Each groove 62 is positioned relative to the outlet 32 of the die to be associated with a corresponding one of the dimples 60, to aid in the flow of the plastic mixture for conforming within the dimple 60.

The multilayer surface 48 may be configured and sized to narrow the depth of the cavity of the die from about 400 mil proximate to the tubular inlet 30 to about 10 mil at the outlet 32 of the die. The sections 50 and transitional steps 52 may be provided to achieve this reduction. The multilevel surface can also cause flow variations in the mixture which influence the form of the color veins as they are flattened and widened from helical segments to nested arches. The end-product moldings can therefore acquire different configurations and wood-grain effects depending on the design of the multilevel surface.

The cavity of the die may be further defined by a bifurcated passage 64 extending from the tubular inlet 30 around the periphery of the multilevel surface 48. The passage may be defined by the wedge-shaped portion 56. The passage may have a rounded bottom and join with the first transitional step, in the case of FIG. 6 step 52d. The passage 64 may extend all the way around the foam-extruding component 34, or may terminate at corresponding side edges 66a,b where it slopes upward toward the outlet 32.

Figure 7:
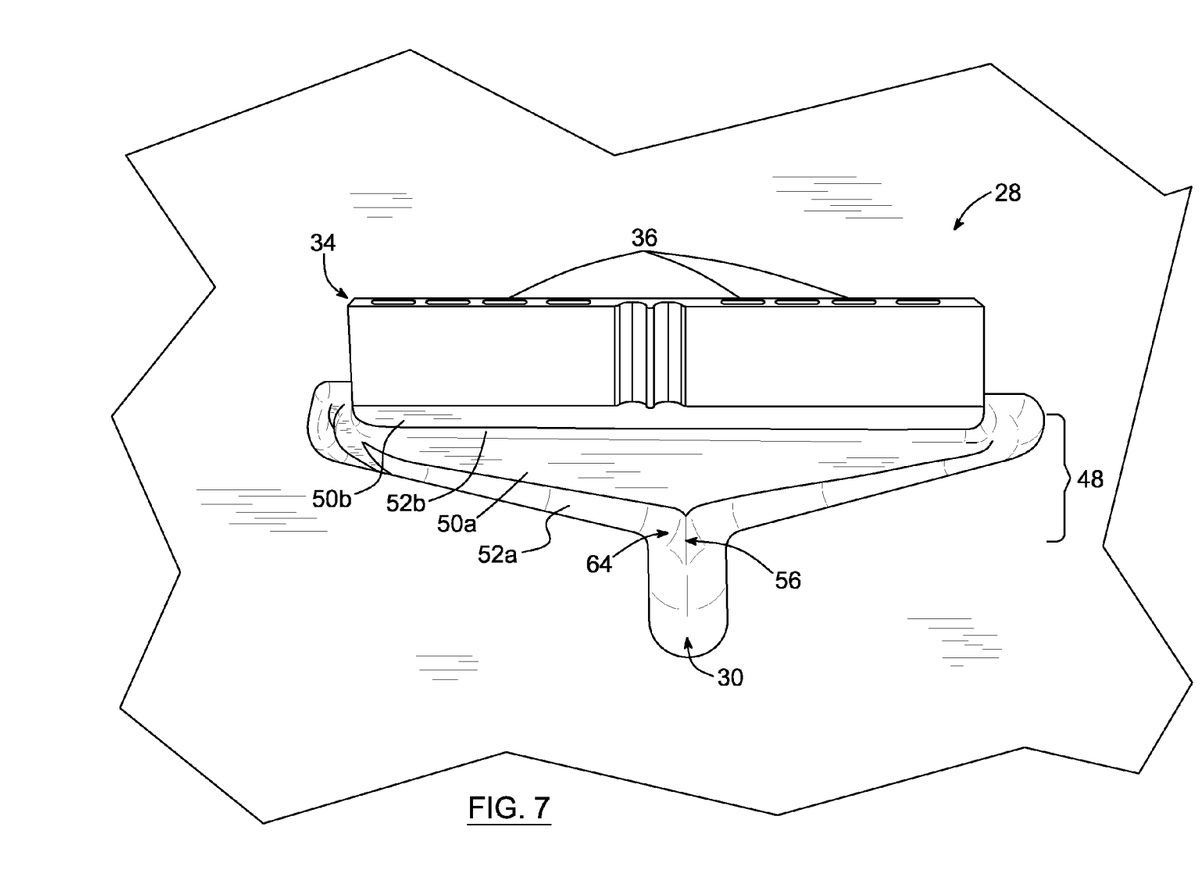
FIG. 7 is a perspective view of part of a die cavity for co-extruding the mixture onto a core, in connection with another embodiment the present invention.
Figure 8:
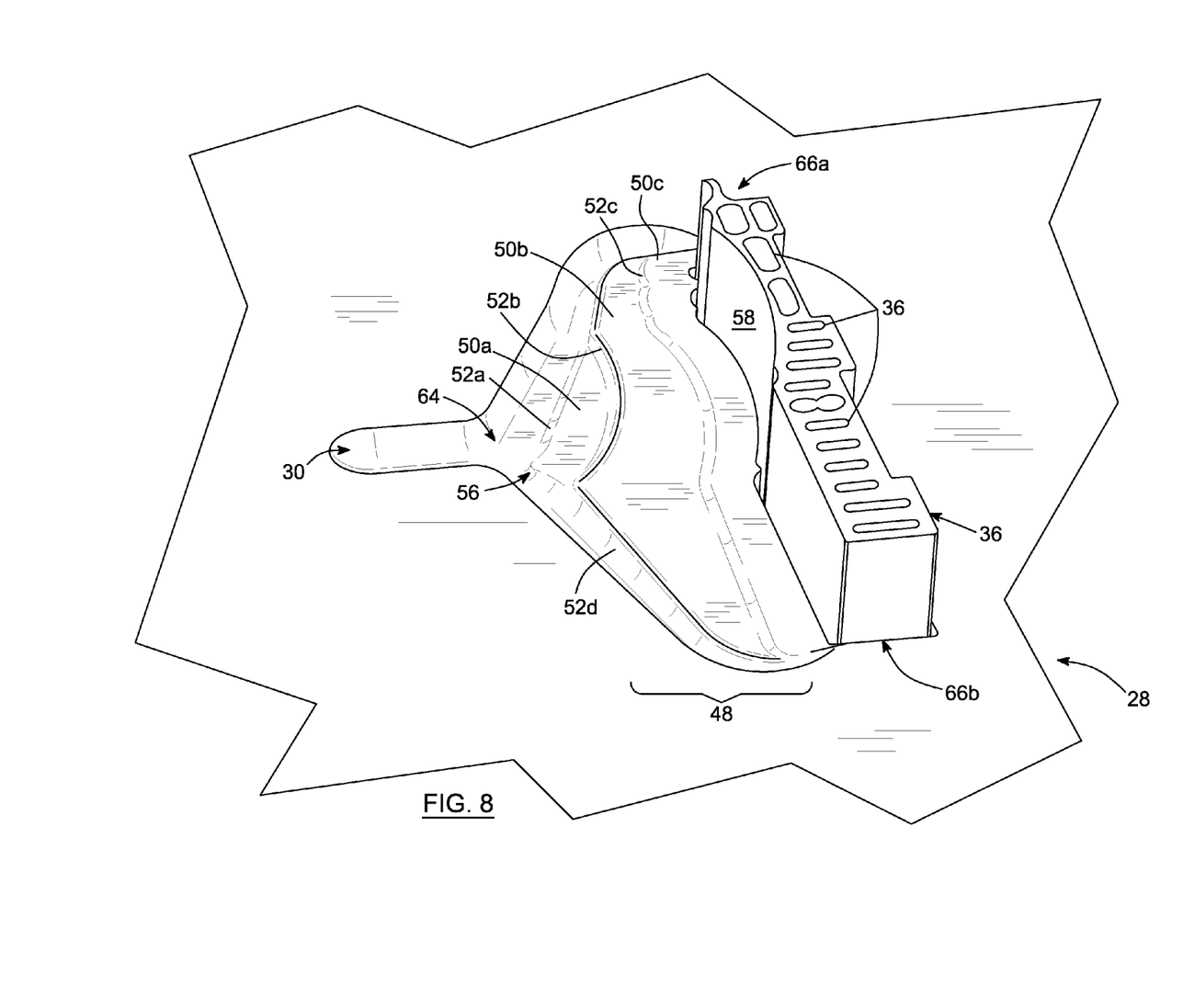
FIG. 8 is a perspective view of part of a die cavity for co-extruding the mixture onto a core, in connection with yet a further embodiment the present invention.

It should be understood from FIGS. 6-8, that the given profile of the molding may be any profile known in the art of decorative moldings, with many combinations of shape elements such as cavetto, ogee, chamfers, cymas, flat, scotia, torus, etc., which are preferably achieved by implementation of a corresponding die with multilevel surface design for conforming to dimples and concavities and convexities and the like. The multilevel surface of the die cavity is preferably designed to guide and distribute the polymer mixture flow for even co-extrusion onto the foam core.

It should also be understood that "decorative molding" includes trim, baseboards, chair rails, crown molding, wainscot, window profiles, wall panels, ceiling panels, vertical/horizontal blinds, shutters, decorative furniture moldings, and other decorative wood replacement type products. Preferably, the moldings are for the interior but may also be for the exterior. Exterior applications could be, for example, millwork, siding, sheds and the like. The decorative moldings are preferably non-structural in the architectural sense, but they may be produced by modifying the strength of the core to achieve structural ability in some applications.

Furthermore, replicating different wood species may be done with the use of a conventional extruder, regular barrel, regular material screw. No longer required are "paper transfers" or "laminates" which due to the design of the profile sections would then also need to be secondary (off-line) operations, requiring specially designed equipment for the application of these laminates and therefore substantially increasing the cost of the end product. This wood modeling effect is achievable by using conventional equipment without any special modifications being necessary to the main extrusion equipment.

Furthermore, different types of wood variations or modeling effects can also be achieved by changing the material base compound chemistry or ingredients in which the pigments are mixed, each of these being somewhat specific to the different wood species. The method which allows us to create these wood variations (shape design, colors, grain length, grain pattern) may be further enhanced by varying the color pigments (additives used for the different colors), the pigment carrier chemistry (the material used with the pigments) and the material base (the compound in which the pigments are mixed into). This effect is magnified when the pigment strand lengths or pellet or granule sizes are of different size or shape combination. The physical properties of the color pigments include the melt-temperature, the lubricants contained therein, the fillers used in the color particles and their relationship with the capstock and the processing conditions.

In addition, no breaker plate is needed in the co-extrusion setup, no material screen pack is needed, and the material cap-stock thickness is efficiently and advantageously controlled.

The present invention also provides a co-extruded decorative molding having a simulated wood appearance and a given profile. It should be understood that the moldings do not contain any actual wood, but are composed on co-extruded polymers to simulate the look of wood grains. The molding comprises a core comprising cellular polymer material and having first and second opposed surfaces; and a coating co-extruded onto the first surface of the core. The coating comprises a base material comprising rigid polymer; and pigmented nested arches within the base material and having a different color from the base material. The pigmented nested arches are formed by flattened and widened pigmented helical vein segments.

Preferably, the co-extruded coating comprises a first layer co-extruded onto the first surface of the core and a second layer co-extruded onto the second surface of the core. The first and second layers of the co-extruded coating may be melt-contacted so as to integrally encompass the core. As explained above, the given profile can have at least one concavity and at least one convexity, and the co-extruded coating can be distributed in a generally constant thickness over the at least one concavity and the at least one convexity. The given profile may also have at least one dimple and the co-extruded coating can be distributed in a generally constant thickness within the at least one dimple.

Some of the benefits of using embodiments of the co-extruded moldings, such as those made of PVC or other thermoplastics, are that they are water and humidity resistant; termites or other insect resistant; require no painting or staining, avoiding the use of harsh chemical products for finishing; make recyclable products; require low or no maintenance; enable easy installation due to lightweight and structural properties; unlike MDF the products will not gas off toxins as material dries; and are extrudable to any length whereas wood has length limitations which results in seams when installed.

EXAMPLES

In one example, polymer capstock "A" was used. It was a the PVC capstock in pellet form with a specific gravity of 1.54, melt temperature (nominal value) of 182-193° C., CLTE of $5.4 \times 10^{-5}$ cm/cm/° C., deflection temperature under load (1.8 MPa, unannealed, 3.18 mm) of 75.0° C., and hardness (shore D, 15 sec) of 84.

In another example, polymer capstock "B" was used. It was a translucent PVC capstock in pellet form with a specific gravity of 1.40, melt temperature (nominal value) of 182-193° C., CLTE of $5.8 \times 10^{-5}$ cm/cm/° C., deflection temperature under load (1.8 MPa, unannealed, 3.18 mm) of 71.1° C., and hardness (shore D, 15 sec) of 82.

In another example, polymer capstock "C" was used. It was a PVC with an equilibrium torque of 1290 M*G and 1.408 g/cm$^3$ specific gravity.

Experiments were conducted to achieve co-extrusion wood modeling. Initially, the barrel and screw were operated at over 20 RPM with a breaker plate and the resulting nested arches were blurred or over-mixed and thus inadequate for the desired wood modeling effect. The RPMs of the screw were lowered to around 10-15, the breaker plate was removed and the barrel temperature was increased to compensate for some of the lost energy that the screw and breaker plate impart to the material. The resulting wood modeling effect was dramatically improved, with distinct nested arches advantageously simulating coloured wood grains. The increased residence time in the barrel did not negatively affect the mixing, melting, flow of the material or the wood modeling effect. The absence of a breaker plate or other obstruction in the barrel allowed the helical veins to resist breakup and mixing while allowing operation at RPM and equipment temperature ranges enabling improved wood modeling effects. It was also found that operating at higher RPMs around 20-25 without a breaker plate resulted in small tight spiral-shaped effects on the final co-extrusion product, which did not resemble most desired wood products. Operating at such high RPMs may be avoided to achieve smooth nested arches which are preferred for many wood modeling effects.

In one example, the screw is operated at 12 RPM, the first barrel zone is at 280 F, the fourth barrel zone is at 325 F, there is no breaker plate, and the die is at 340 F. Between 0.3% and 8.0% of color particles were introduced into the material for allowing the wood modeling effects.

The present invention provides not only a co-extrusion process and co-extruded molding product, but also a variety of device improvements, as described and illustrated herein, for aiding in producing decorative wood-appearance moldings.

The invention claimed is:

1. A co-extrusion process for making decorative moldings having a simulated wood appearance and a given profile, comprising:

mixing a base material and colour particles to form a mixture, the base material comprising rigid polymer and the colour particles having a different colour from the base material and a higher melt temperature than the base material;

heating and displacing the mixture using a feed screw such that the colour particles move helically along the trajectory of the feed screw while avoiding backflow and melting to thereby create corresponding helical vein segments within the base material;

forcing the mixture through a tubular channel while controlling heat and shear conditions such that the helical vein segments remain substantially intact;

feeding the mixture into a die having at least a first tubular inlet communicating with the tubular channel, a first outlet having a planar shape corresponding to the given profile, and a first cavity in between the inlet and the outlet, the cavity having a form to flatten and widen the mixture to produce a planar surface coating at the outlet wherein the helical vein segments are transposed into two-dimensional nested arches simulating wood appearance; and co-extruding the surface coating onto a first side of a core comprising cellular polymer material, thereby producing the decorative mouldings;

wherein a fraction of the color particles are sized and selected such that the color particles partially melt to form partially melted helical vein segments each of the partially melted helical vein segments having a head end and a tail end, thereby leaving a residual nodule of the color particle at each head end.

2. The process of claim 1, wherein controlling the heat and shear conditions comprises controlling the rotational speed of the feed screw, the heat imparted to the mixture, and the diameter of the tubular channel.

3. The process of claim 1, wherein controlling the heat imparted to the mixture comprises maintaining the temperature of the mixture higher than the melting temperature of the base material and at or below the melting temperature of the color particles.

4. The process of claim 1, wherein the temperature of the mixture is maintained at about 15° C. above the melting temperature of the base material.

5. The process of claim 1, wherein the melt temperature of the base material is about 20 to 30° C. higher that the melt temperature of the colour particles.

6. The process of claim 1, wherein the feed screw comprises a screw and a barrel, the screw and the barrel having a tolerance of about 5 mil.

7. The process of claim 1, wherein the color particles are sized and selected such that each color particle completely melts when forming a corresponding one of the helical vein segments.

8. The process of claim 1, wherein the colour particles comprise a pigment and a carrier, the pigment having a different colour from the base material and the carrier having a higher melt temperature than the base material.

9. The process of claim 1, wherein the base material has a white or neutral color.

10. The process of claim 1, wherein the color particles comprise a first set having a first color and a second set having a second color, the first and second colors being different.

11. A co-extrusion process for making decorative moldings having a simulated wood appearance and a given profile, comprising:
mixing a base material and colour particles to form a mixture, the base material comprising rigid polymer and the colour particles having a different colour from the base material and a higher melt temperature than the base material;
heating and displacing the mixture using a feed screw such that the colour particles move helically along the trajectory of the feed screw while avoiding backflow and melting to thereby create corresponding helical vein segments within the base material;
forcing the mixture through a tubular channel while controlling heat and shear conditions such that the helical vein segments remain substantially intact;
feeding the mixture into a die having at least a first tubular inlet communicating with the tubular channel, a first outlet having a planar shape corresponding to the given profile, and a first cavity in between the inlet and the outlet, the cavity having a form to flatten and widen the mixture to produce a planar surface coating at the outlet wherein the helical vein segments are transposed into two-dimensional nested arches simulating wood appearance; and
co-extruding the surface coating onto a first side of a core comprising cellular polymer material, thereby producing the decorative mouldings;
wherein the cavity of the die is defined by a multilevel surface comprising a plurality of sections with transitional steps bridging adjacent ones of the sections to cause the mixture to distribute evenly at the outlet to correspond to the given profile.

12. The process of claim 11, wherein the transitional steps are curvilinear.

13. The process of claim 11, wherein each transitional step and corresponding section is joined at a bevelled edge.

14. The process of claim 11, wherein the multilevel surface comprises a wedge-shaped portion projecting upstream proximate to the inlet for diverting the mixture to either side.

15. The process of claim 14, wherein the wedge-shaped portion has a camel back shape.

16. The process of claim 14, wherein the wedge-shaped portion is defined by part of at least one of the transitional steps.

17. The process of claim 11, wherein the plurality of sections comprise a bottom section having a first thickness, and a top section having a second thickness greater than the first thickness.

18. The process of claim 17, wherein the plurality of sections comprises at least one intermediate section, each provided between the top and bottom sections.

19. The process of claim 11, wherein at least one of the sections is a cove-shaped section, each cove-shaped section being bordered by a corresponding one of the transitional steps.

20. The process of claim 19, wherein the given profile comprises at least one concavity and each cove-shaped section is positioned relative to the outlet of the die to be associated with a corresponding one of the concavities.

21. The process of claim 11, wherein the given profile comprises at least one dimple and at least one of the transitional steps comprises a groove corresponding to each of the at least one dimples, each groove being positioned relative to the outlet of the die to be associated with a corresponding one of the dimples.

22. The process of claim 11, wherein the multilayer surface narrows the depth of the cavity of the die from about 400 mil proximate to the tubular inlet to about 10 mil at the outlet of the die.

23. The process of claim 11, wherein the cavity of the die further comprises a bifurcated passage extending from the tubular inlet around the multilevel surface.

24. The process of claim 11, wherein the die comprises a core-extruding component extending away from the cavity, the core-extruding component having an outer surface for bearing the mixture and apertures for extruding the cellular polymer material, wherein the mixture flows along the outer surface and beyond the apertures to form the surface coating where the cellular polymer material expands to contact the surface coating and form the co-extruded decorative moulding.

* * * * *